J. M. JAMES.
DISPENSING DEVICE.
APPLICATION FILED DEC. 14, 1920.

1,409,003.

Patented Mar. 7, 1922.
4 SHEETS—SHEET 1.

J. M. James
INVENTOR

BY Victor J. Evans
ATTORNEY

J. M. JAMES.
DISPENSING DEVICE.
APPLICATION FILED DEC. 14, 1920.
1,409,003.
Patented Mar. 7, 1922.
4 SHEETS—SHEET 2.
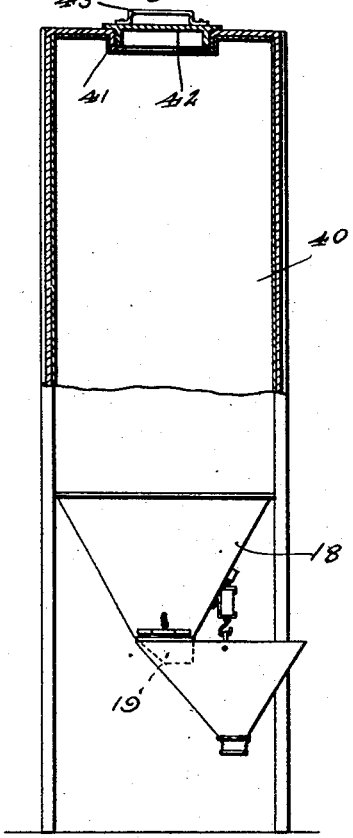
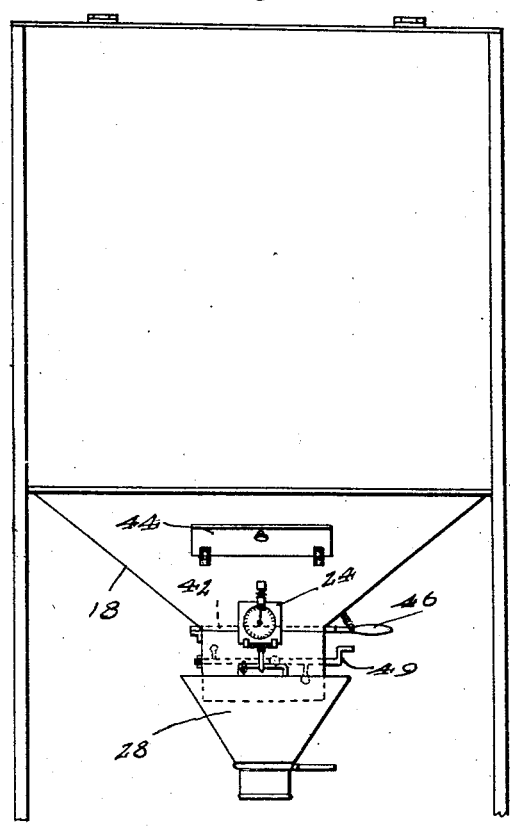
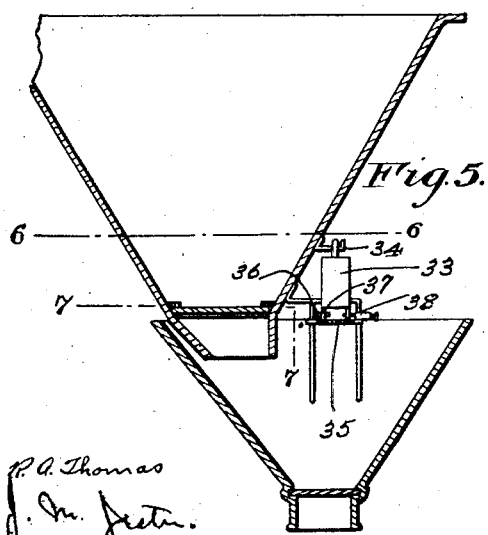
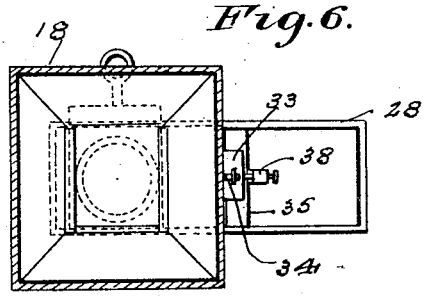
J. M. James INVENTOR

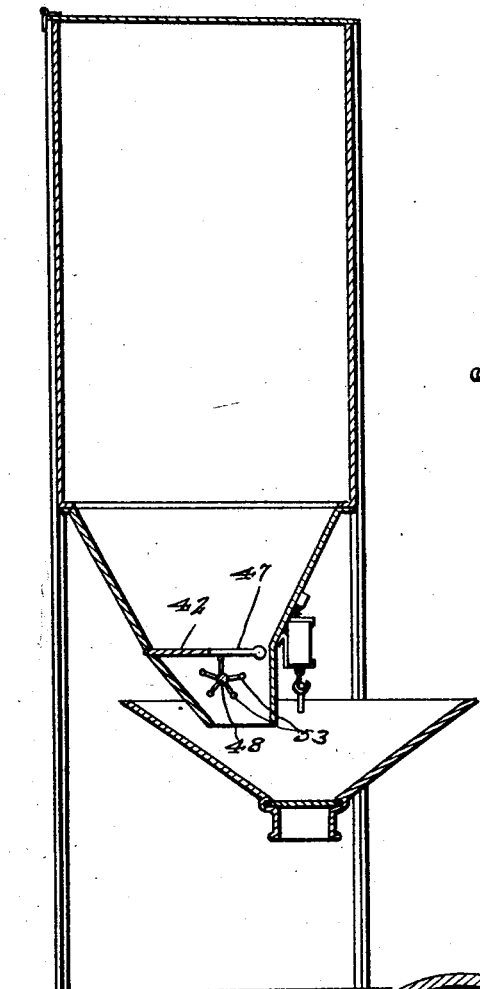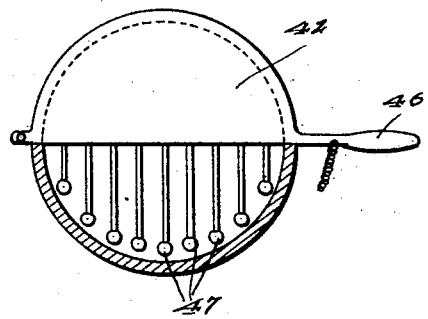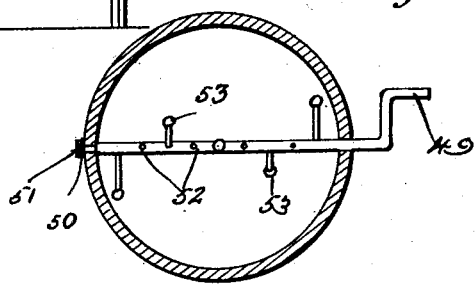

J. M. JAMES.
DISPENSING DEVICE.
APPLICATION FILED DEC. 14, 1920.
1,409,003.
Patented Mar. 7, 1922.
4 SHEETS—SHEET 4.
Fig. 13.
Fig. 14.
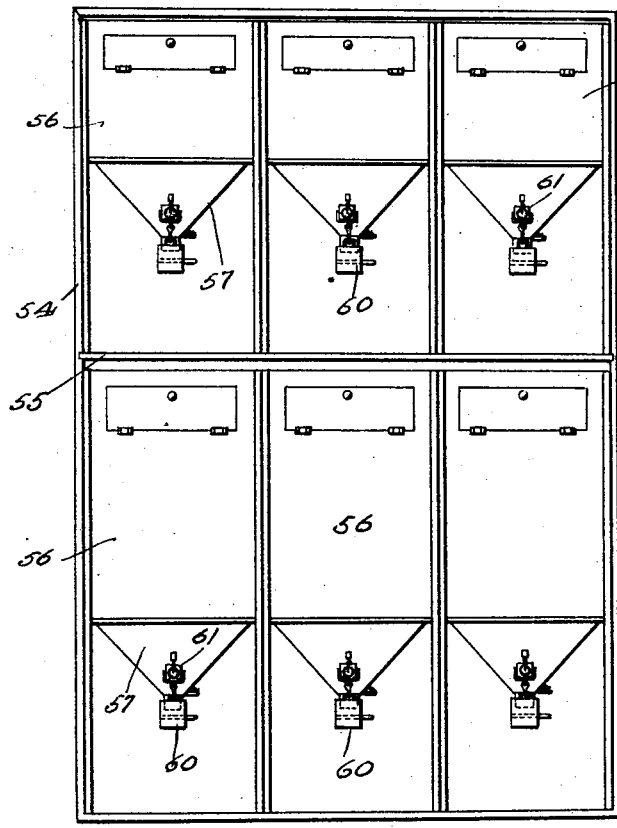
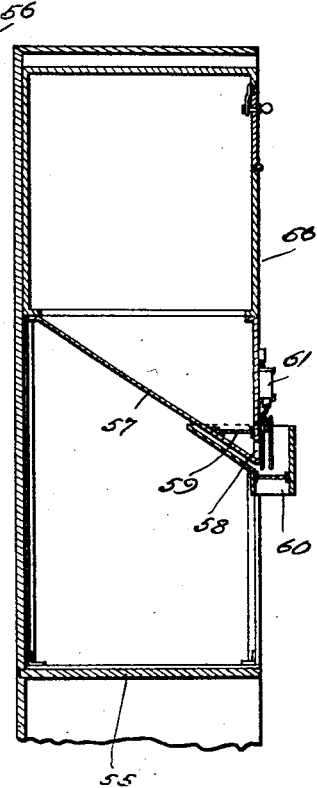
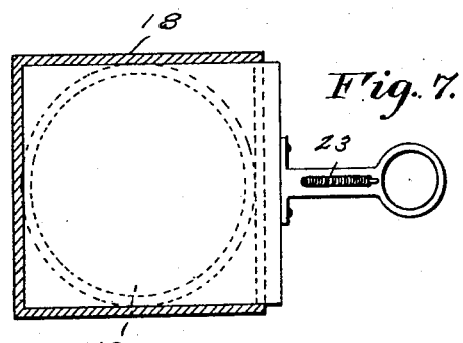
Fig. 7.
WITNESSES
R. A. Thomas
INVENTOR
J. M. James
BY Victor J. Evans
ATTORNEY

UNITED STATES PATENT OFFICE.

JAMES M. JAMES, OF EDGARTON, WEST VIRGINIA.

DISPENSING DEVICE.

1,409,003.  Specification of Letters Patent.  Patented Mar. 7, 1922.

Application filed December 14, 1920. Serial No. 430,717.

*To all whom it may concern:*

Be it known that I, JAMES M. JAMES, a citizen of the United States, residing at Edgarton, in the county of Mingo and State of West Virginia, have invented new and useful Improvements in Dispensing Devices, of which the following is a specification.

This invention relates to dispensing devices, particularly to weighers, and has for its object the provision of a hopper structure adapted for association with a bin holding any commodity in dry form, the hopper having associated therewith a receiver into which the contents of the bin may be allowed to flow, a scale structure being provided whereby the weight of the matter within the receiver may be ascertained.

An important object is the provision of a device of this character in which the hopper member is provided with a cut-off valve for cutting off the flow of material into the receiver and in which the receiver is likewise provided with a valve controlling the outlet of the material from the receiver into the paper bag or other receptacle.

Another object is the provision of a device of this character in which the scale may be associated either with the receiver or with the hopper and in which the scale is furthermore removable.

A further object is the provision of a device of this character which may be specially formed for weighing potatoes, in which event a novel feed mechanism is provided for preventing choking of the potatoes in the mouth of the hopper.

An additional object is the provision of a device of this character which will be simple and inexpensive in manufacture and installation, which may be easily built into already existing bins, which may likewise be arranged in cabinet form for store service, which will be efficient and durable in use, and a general improvement in the art.

With the above and other objects and advantages in view, the invention consists in the details of construction to be hereinafter more fully described and claimed and illustrated in the accompanying drawings in which—

Figure 1:
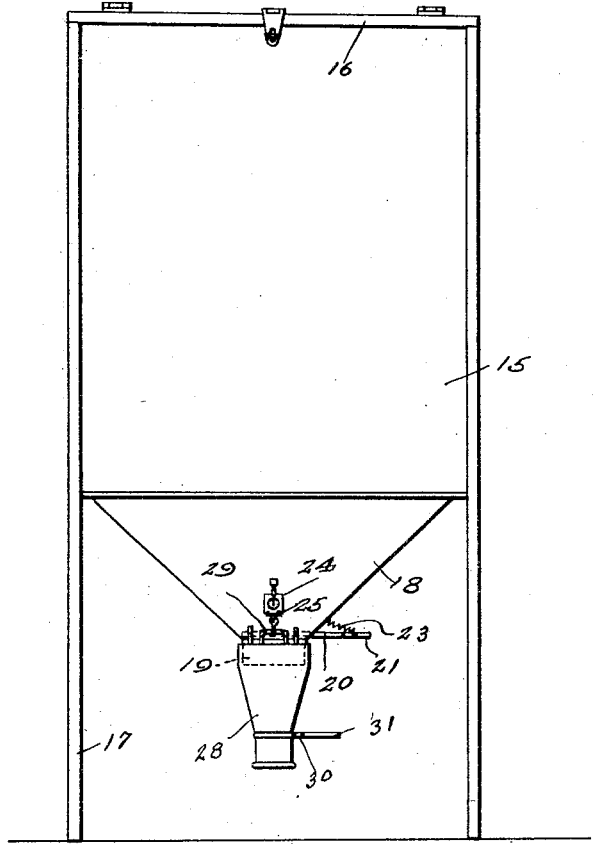
Figure 1 is a front elevation of a bin having my device associated therewith.
Figure 2:
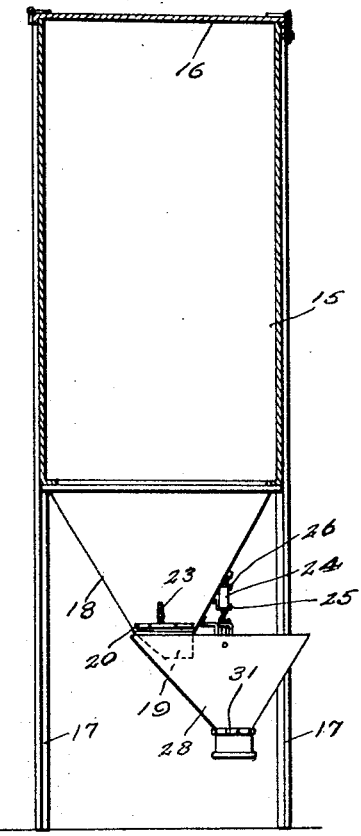
Figure 2 is a side elevation of my device, the bin being in section.
Figure 3:
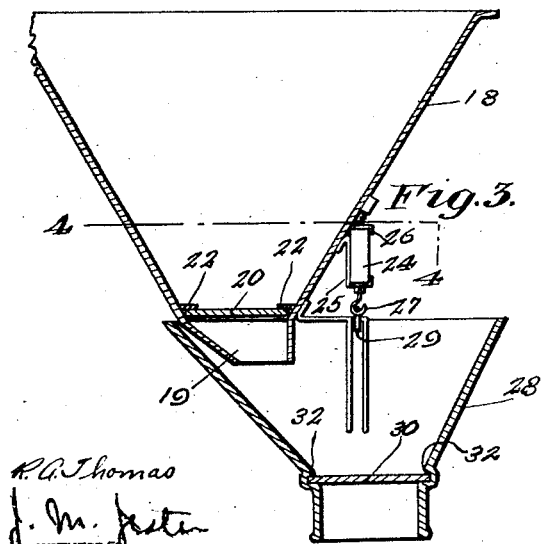
Figure 4:
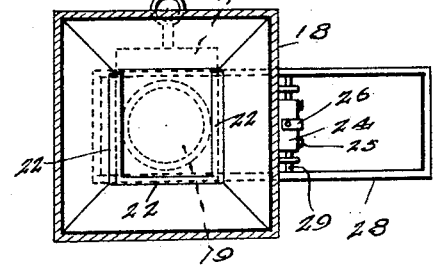

Figure 3 is a longitudinal sectional view through my device removed and showing one form of scale mounting, Figure 4 is a horizontal sectional view therethrough, taken above the receiver, Figure 5 is a longitudinal sectional view showing a different scale mounting, Figure 6 is a cross sectional view therethrough, taken above the receiver, Figure 7 is a detail cross sectional view on the line 7—7 of Figure 5, Figure 8 is a longitudinal sectional view through a different form of device, Figure 9 is a front elevation of the device showing the form adapted for use in weighing potatoes, Figure 10 is a longitudinal sectional view therethrough, Figure 11 is a detail cross sectional view showing the cut off valve, Figure 12 is a detail sectional view showing the potato feed, Figure 13 is a front elevation showing my device arranged in cabinet form, and Figure 14 is a longitudinal sectional view therethrough.

Referring more particularly to the drawings, the numeral 15 designates a bin which is preferably constructed of metal and which is preferably rectangular in shape and of greater height than width and of greater width than thickness. This bin is provided with a hinged cover 16 permitting access thereto for filling purposes. The bin is preferably supported upon suitable legs 17 which elevate it a sufficient distance to permit the insertion of any desired receptacle beneath the bin.

In carrying out my invention I provide a hopper 18 which is located beneath the bin and which forms the bottom thereof. This hopper is preferably of frusto-pyramidal shape, that is all of its sides converge downwardly to a throat 19 which may be rectangular or cylindrical, as preferred. Located at the throat 19 is a cut-off valve formed as a disk or plate 20 having a handle 21 and movable within suitable guides 22. A suitable spring 23 is provided for normally holding this cut-off valve in closed position so that it cannot be accidentally left open.

In the form shown in Figures 1 to 4 inclusive, I provide a spring scale 24 of conventional pattern mounted upon the hopper 18 adjacent the throat portion and supported by a suitable bracket 25 and held in place by a spring catch 26 engaging its top. In this instance the scale is provided with a hook 27. In this form I make use of a receiving receptacle 28 which is suspended beneath the hopper by a bail 29 engaged upon the hook 27. At the discharge end of this receiver is provided a cut-off valve formed as a plate or disk 30 having a suitable handle 31 and mounted within guides 32.

In the operation of this form of the device the operator opens the cut-off valve 20 by moving the handle 21, whereupon the material within the bin and hopper will pass out through the throat 19 into the receiver 28 and the scale 24 will indicate the amount of matter within the receiver. When the desired amount is deposited within the receiver, as evidenced by the scale, the operator closes the cut-off valve 20. Any suitable receptacle, such as a paper bag or the like, may be disposed beneath the receiver 28 whereupon the valve 30 is opened to permit the material within the receiver to discharge into said receptacle. This form of device is particularly designed for relatively heavy weighing.

In Figures 5, 6 and 7 I have shown a slight modification. In this form the scale 33 is carried by the receiver and is so mounted that the receiver will properly balance when it is suspended under the hopper by means of a hook 34 mounted on the hopper. In this instance the top of the receiver is partially covered, as indicated at 35, and the scale rests on this cover portion, being held in place by a pair of tongues 36 on the back side engaged beneath staples 37, and is also held by a spring catch 38 on the front side. It will be seen that this specific mounting for the scale permits removal of the scale very easily so that it may be used on different receivers. In order to prevent the receiver from swinging to one side when weighing or when the valve 32 is pulled open, the bail works between a pair of upright guides in both forms. In the form where the receiver carries the scales an arm serves as a bail and this arm is provided with a small tongue or projection on each side near its top or upper end and in this case these projections work between the upright guides.

In Figure 8 I have shown a bin designed particularly for handling calcium carbide, lime, drugs, or various other materials which might deteriorate when exposed to the air. In this instance the bin 40 is made of metal and may be lined with any suitable material not acted upon by the substances within the bin.

The bin is provided in its top with a circular opening 41 normally closed by the airtight screw cap 42 having a handle 43. In other respects this form is identically the same as the previously described forms.

Referring to Figures 9 to 12, inclusive, I have shown my device as designed particularly for weighing potatoes. In this form the structure is exactly the same as in the previously described forms except that the hopper is preferably provided in one side with a trap door 44 which permits access in case the potatoes should clog. There is, however, a slight difference in the cut-off valve for the hopper, this cut-off valve being more clearly shown in Figure 11 and comprising a plate or disk portion 42 having a handle 46 and provided with a plurality of blunt teeth or pins 47, the bluntness of which is to avoid cutting or breaking the potatoes. If desirable, I may also make use of feeding device shown more particularly in Figure 12, which consists of a shaft 48 journaled below the throat of the hopper and having one end formed with a handle 49. This shaft is prevented from longitudinal movement by washers 50 held in place by keeper pins or nuts 51, as preferred. The shaft 48 is provided with a series of holes 52 within selected ones of which may be engaged teeth 53 which are blunt. It will be seen that if the potatoes should clog in passing through the throat, the operator may rotate the shaft 48 whereupon the teeth 53 will engage the potatoes and force them downwardly into the receiver. The scale mounting and arrangement of this form is preferably the same as that shown in Figures 1 to 4, that is the scale is carried by the hopper and the receiver is suspended from a hook carried by the scale. In every other respect this form of the device is identically the same as the previously described forms.

In Figures 13 and 14 I have shown a cabinet 54 which includes shelves 55 above which are mounted bins 56 designed to contain different materials. Located beneath each bin 56 is a hopper 57 which is preferably in frusto-pyramidal shape as in the previously described forms but which is merely inclined toward the front of the cabinet. At the lower end of each hopper 57 is a chute 58 having a cut-off valve 59 and beneath which is suspended a receiver 60 carrying a scale 61. The arrangement of the receiver and scale is the same as that shown in Figures 5, 6 and 7.

From the foregoing description and a study of the drawings it will be apparent that I have thus provided a simply constructed and easily operated weighing device by means of which any dry material disposed within the bin may be quickly and easily and also accurately weighed out and dispensed in a very sanitary, efficient, and labor saving manner. Owing to the accuracy that it is possible to attain, it will be seen that the device will be economical as the exact weight may be easily dispensed.

While I have shown and described the preferred embodiments of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a bin adapted to contain dry material, a hopper beneath said bin having downwardly converging sides defining an outlet throat, a receiver suspended beneath said hopper and having an outlet valve, a spring scale operated by weight of material within said receiver, and a cut-off valve within said throat formed as a portion of a disk having a handle and movable between guides and a plurality of blunt teeth projecting from said disk portion.

2. A device of the character described comprising a bin adapted to contain dry material, a hopper beneath said bin, a receiver suspended beneath said hopper and having an outlet valve, a spring scale operated by weight of material within said receiver, and a cut-off valve within the discharge end of the hopper and formed as a disk provided with a handle, said disk being semi-circular and solid and provided with a plurality of blunt teeth of varying length projecting from its straight edge.

3. A device of the character described comprising a bin, a hopper located beneath said bin and having downwardly converging sides defining an outlet throat, a cut-off valve in said throat, a rotary feeding device located within said throat and operable to prevent choking of material therein, a scale carried by the lower end of said hopper, a receiver located beneath the hopper and having a bail suspended from the scale and a guide device engageable by the bail whereby to prevent tipping of the receiver.

In testimony whereof I affix my signature.

JAMES M. JAMES.